(12) United States Patent
Reinhardt et al.

(10) Patent No.: US 7,530,772 B2
(45) Date of Patent: May 12, 2009

(54) DRILL, SUCH AS A TWIST DRILL

(75) Inventors: Werner Reinhardt, Unterleinleiter (DE); Tilo Krieg, Fürth (DE)

(73) Assignee: Kennametal Inc., Latrobe, PA (US)

( * ) Notice: Subject to any disclaimer, the term of this patent is extended or adjusted under 35 U.S.C. 154(b) by 215 days.

(21) Appl. No.: 11/563,325

(22) Filed: Nov. 27, 2006

(65) Prior Publication Data
US 2007/0134071 A1    Jun. 14, 2007

Related U.S. Application Data

(63) Continuation-in-part of application No. PCT/EP2005/005234, filed on May 13, 2005.

(30) Foreign Application Priority Data

May 28, 2004 (DE) ............... 20 2004 008 700 U
Jul. 14, 2004 (DE) ............... 20 2004 010 977 U

(51) Int. Cl.
*B23B 51/02* (2006.01)
(52) U.S. Cl. ..................... 408/230; 408/227
(58) Field of Classification Search ........... 408/227, 408/229, 230; *B23B 51/00, 51/02*
See application file for complete search history.

(56) References Cited

U.S. PATENT DOCUMENTS

| | | | | |
|---|---|---|---|---|
| 2,400,856 A | * | 5/1946 | Thompson | 408/233 |
| 4,620,822 A | * | 11/1986 | Haque et al. | 408/224 |
| 5,626,446 A | | 5/1997 | Ching | |
| 5,700,113 A | | 12/1997 | Stone et al. | |
| 6,135,681 A | | 10/2000 | Nuzzi et al. | |
| 6,315,505 B1 | | 11/2001 | Moore | |
| D477,515 S | * | 7/2003 | Winivis | D8/70 |
| 7,422,396 B2 | * | 9/2008 | Takikawa | 408/59 |
| 2004/0151553 A1 | * | 8/2004 | George et al. | 408/230 |

FOREIGN PATENT DOCUMENTS

| | | |
|---|---|---|
| DE | 1 177 904 B | 9/1964 |
| DE | 3316193 A1 * | 11/1984 |
| DE | 89 01 319 U1 | 4/1989 |
| DE | 44 17 166 A1 | 2/1995 |

(Continued)

OTHER PUBLICATIONS

International Search Report PCT/EP2005/005234 and English translation thereof.

(Continued)

*Primary Examiner*—Daniel W Howell
(74) *Attorney, Agent, or Firm*—Larry R. Meenan

(57) ABSTRACT

A drill bit, such as a twist drill, having a body equipped with flutes, as well as a drill bit face that includes two main cutting edges that merge together. In order to drill a blind hole, such as with a level drilled bottom, the main cutting edge forms a continuous cutting edge that runs in a plane perpendicular to the drill bit's longitudinal axis. The main cutting edges, with respect to a cutting direction, are arranged behind a center line lying in the plane which is perpendicular to the longitudinal axis of the drill and extending through the center of the drill as well as in the direction of the main cutting edges.

20 Claims, 3 Drawing Sheets

FOREIGN PATENT DOCUMENTS

| | | |
|---|---|---|
| DE | 296 09 017 U1 | 8/1996 |
| DE | 202 09 767 U1 | 11/2003 |
| DE | 10337985 A1 * | 3/2005 |
| EP | 0 089 123 A1 | 9/1983 |
| EP | 88037 A1 * | 9/1983 |
| EP | 127322 A1 * | 12/1984 |
| JP | 2006088267 A * | 4/2006 |

OTHER PUBLICATIONS

German Search Report 20 2004 010 977.8.
International Preliminary Report on Patentability PCT/EP2005/005234 and English translation thereof.

* cited by examiner

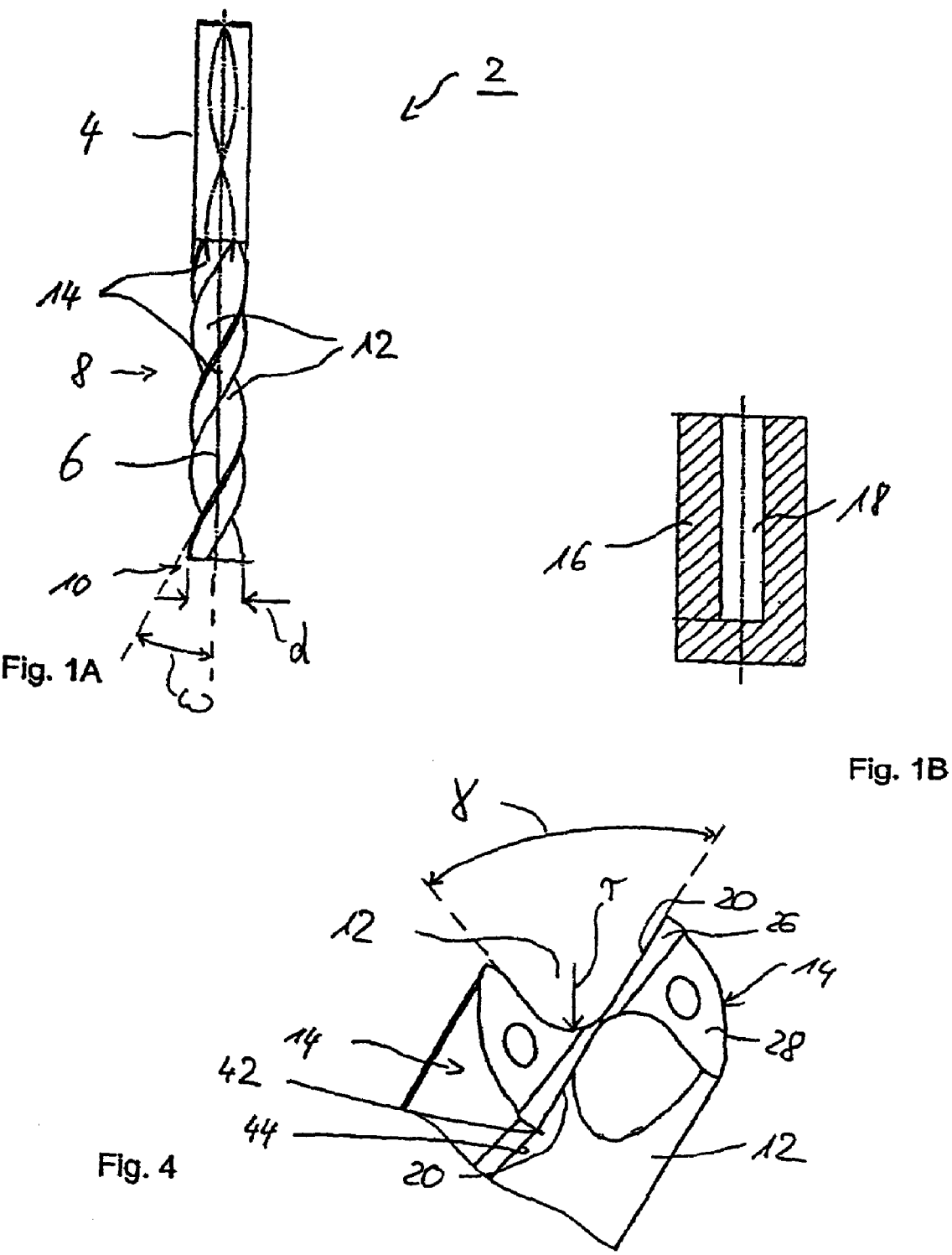

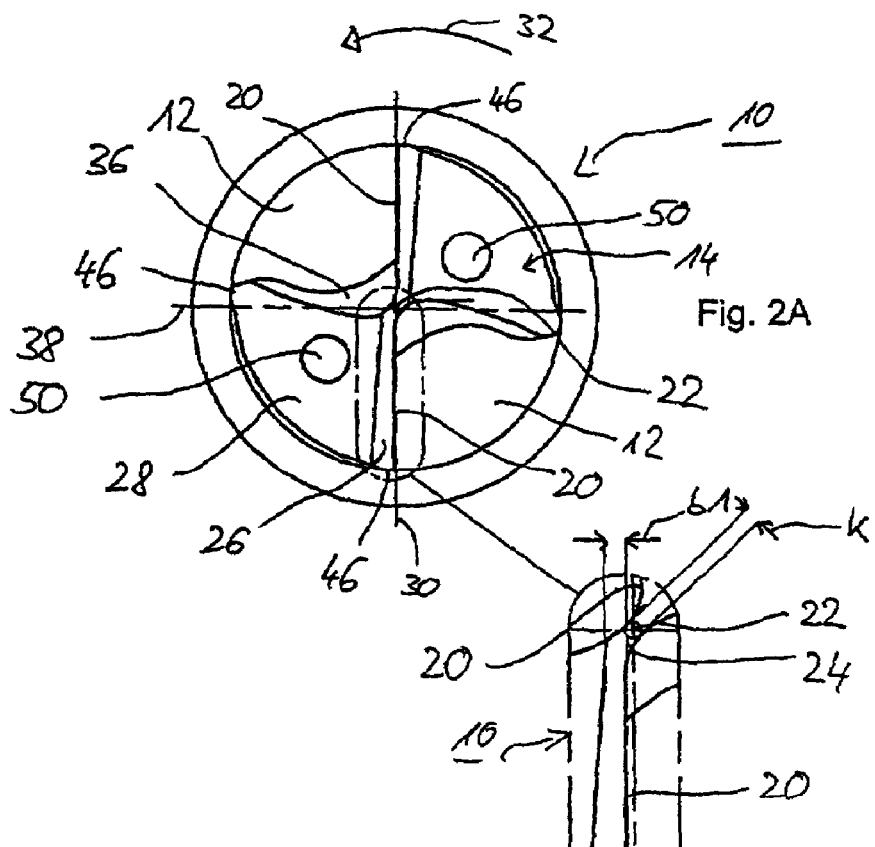
Fig. 2A
Fig. 2B
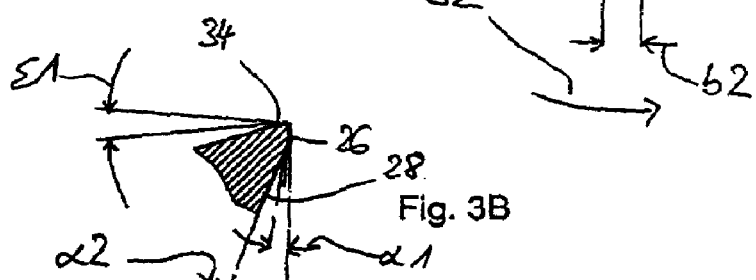
Fig. 3B
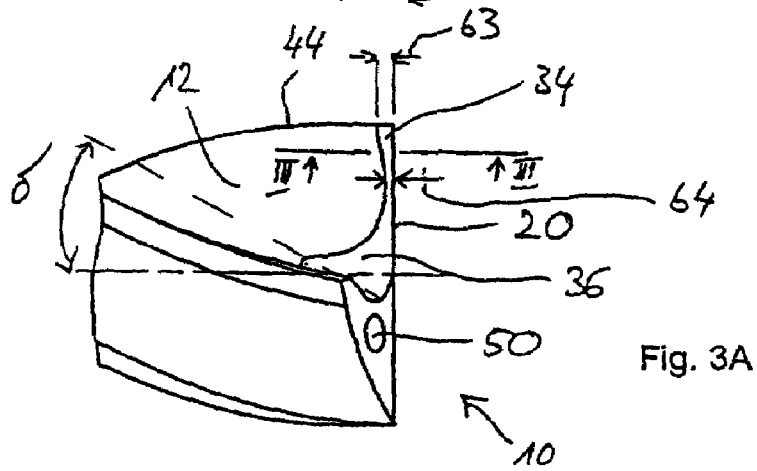
Fig. 3A

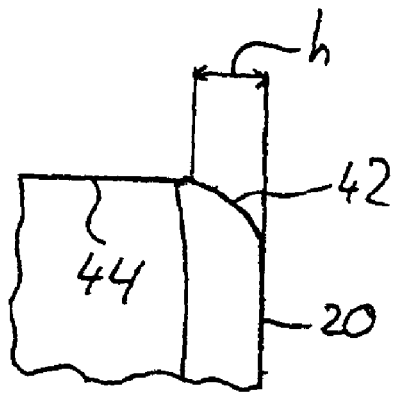
Fig. 7
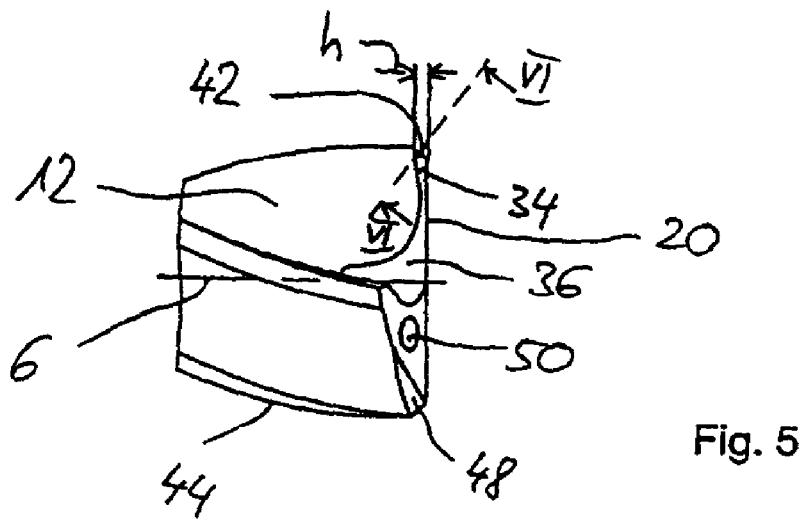
Fig. 5
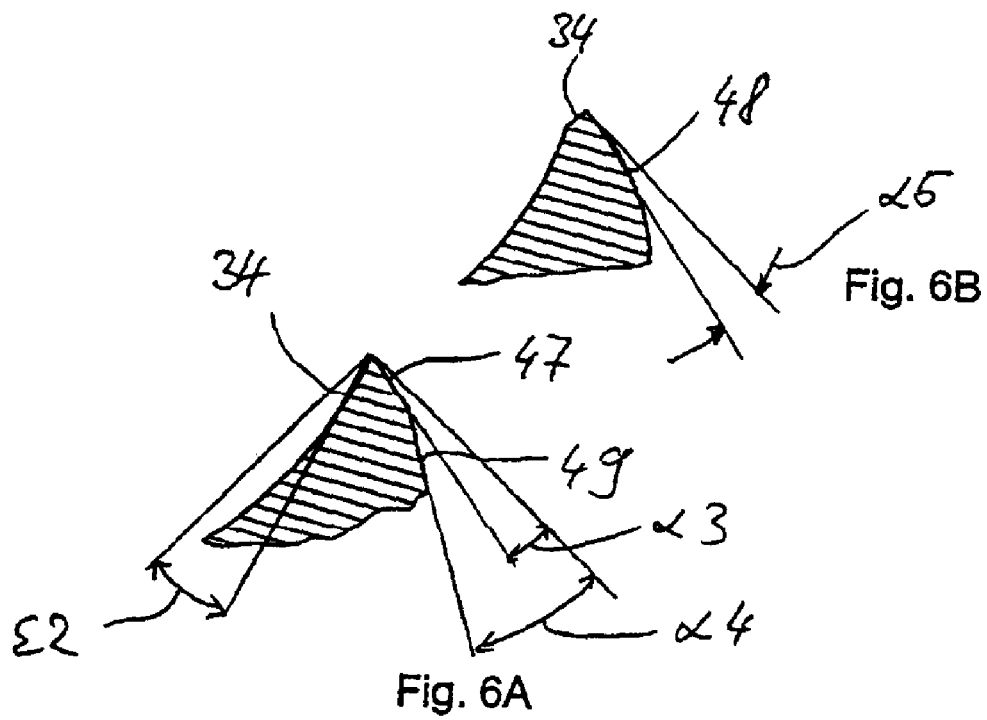
Fig. 6B
Fig. 6A

DRILL, SUCH AS A TWIST DRILL

CONTINUING APPLICATION DATA

This application is a Continuation-In-Part application of International Patent Application No. PCT/EP2005/005234, filed on May 13, 2005, which claims priority from both Federal Republic of Germany Patent Application No. 20 2004 008 700.6, filed on May 28, 2004, and Federal Republic of Germany Patent Application No. 20 2004 010 977.8, filed on Jul. 14, 2004. International Patent Application No. PCT/EP2005/005234 was pending as of the filing date of this application. The United States was an elected state in International Patent Application No. PCT/EP2005/005234.

BACKGROUND

1. Technical Field

The present application relates to a drill, such as a twist drill, having a body provided with chip flutes as well as a drill front provided with at least two main cutting edges merging into each other.

2. Background Information

According to standard DIN ISO 5419, such a twist drill comprises a drill tip, herein referred to as drill front, which substantially provides the cutting functionality of the drill. Adjacent to the drill tip, there is a body, into which the chip flutes, extending, in at least one possible embodiment, in helical form and starting each at a main cutting edge of the drill tip, are formed. In the longitudinal direction of the drill, a shaft, by which the drill is chucked and held, is adjacent to the body.

In a conventional twist drill with two main cutting edges, these are arranged relative to each other at an acute angle, as described in DIN 1414-1. The two main cutting edges are connected with each other through a chisel edge arranged in the center of the drill. In the area of the chisel edge, the drill tip has a web thickness. The chisel edge is at the same time the foremost point of the drill, to which the main cutting edges are adjacent in the way of a conical surface, as well as the tool flanks, which are adjacent to the main cutting edges.

The drilling operation of such a twist drill in a workpiece forms a drill hole with a cone-shaped bottom. For certain applications, however, blind holes with a bottom as planar or flat as possible are desired. It is not possible to drill such blind holes by means of a conventional twist drill, due to the inclination of the main cutting edges to each other at an acute angle.

European Patent No. 0 089 123 A1 describes a drill for producing a hole with an almost planar bottom. This drill is provided with a primary edge arranged in the center of the drill and only extending over a partial section of the drill diameter. A secondary edge, set off in the longitudinal direction of the drill, is adjacent to one side, which secondary edge extends from the primary edge to the outer circumference of the drill. Due to the projecting primary cutting edge, this drill is also not able to produce a hole bottom with a completely planar surface. The projecting primary edge is necessary in this case for centering purposes.

Furthermore, German Patent Publication Published for Opposition Purposes No. 1 177 904 describes a slot milling cutter, which is provided on its front face with a total of four front cutting edges, which are, however, not connected with each other over the center of the cutter. Such a milling cutter is, however, not suitable for drilling operations due to the fact that it has no cutting edge in the center area, and thus a purely rotational movement will not remove any chips in the center area. The cutter must, therefore, necessarily be moved in a lateral direction, too.

U.S. Pat. No. 6,135,681 describes a plane-bottom drill with a cutting bit whose main cutting edges extend in a plane which is perpendicular to the longitudinal axis of the drill.

OBJECT OR OBJECTS

The object of at least one possible embodiment of the present application is to provide a drilling tool or a drill, with which a blind hole with a flat, planar bottom can be produced.

SUMMARY

The object of the present application may be solved by at least one possible embodiment of a drill, such as a twist drill, having a body provided with chip flutes, as well as a drill front provided with two main cutting edges merging into each other, wherein the main cutting edges form a common, continuous edge extending in a plane which is perpendicular to the longitudinal axis of the drill. Therefore, the two main cutting edges are oriented to each other at an angle of 180°. The drill does not have a projecting tip, so that the bottom of the drill hole is substantially completely even and planar. The edge formed by the main cutting edges extends over the entire drill diameter. The main cutting edges are preferably arranged symmetrically to each other and, in at least one possible embodiment, point-symmetrically with respect to the drill center.

One advantage of this drill designed as a plane-bottom drill is the fact that for the production of, for example, blind holes with a completely planar hole bottom, at least approximately the same cutting parameters and the same process and drilling times are achieved as with a conventional twist drill with a conical drill tip. Thus, as compared with conventional slot mills, which usually have only one front edge and a large web diameter, clearly shorter process times are achieved, i.e. the machining time for the production of a blind hole is clearly shorter.

With the plane-bottom drill, exact blind hole shapes with planar bottoms, in at least one possible embodiment also with stepped drill-hole walls (stepped holes), are possible without substantial problems and with substantial economic efficiency. To form a stepped hole, as it is necessary, e.g., for forming a valve seat, the plane-bottom drill has additional cutting edges, which extend radially outwards and which are offset against the main cutting edges by one step depth. Furthermore, when the plane-bottom drill is used for drilling through-holes, it will produce hole rims with little burr.

Another advantage of the substantially completely planar orientation of the edge with an end-face cutting edge is the fact that the drill can also be applied on curved surfaces essentially without the negative effect of being strongly pushed aside, which is contrary to a conical drill tip.

Due to the continuous edge with a perpendicular orientation to the longitudinal axis of the drill, a uniform chip removal in one plane is achieved over the entire drill diameter.

Furthermore, the main cutting edges—relation to the cutting direction of the drill—are arranged behind a center line, lying in the plane which is perpendicular to the longitudinal axis of the drill and extending through the center of the drill. Each of the main cutting edges is situated offset, in at least one embodiment by half a web diameter, against the center line. Thanks to this measure, the main cutting edges can be ground essentially without problems with a grinding wheel, without touching the second main cutting edge when grinding the first main cutting edge.

In at least one possible embodiment, the main cutting edges are straight-lined, so that the edge runs approximately along a line. In this way, the forces acting upon the drill are symmetrically distributed, so that during the drilling operation, the drill is subjected to only slight lateral forces, which would negatively influence the geometry of the drill-hole.

In at least one possible embodiment, the two main cutting edges are connected with each other through a remaining chisel edge in a center of the drill front, so that the main cutting edges are offset against each other in the plane which is perpendicular to the longitudinal axis of the drill. The remaining chisel edge has only a small dimension, so that the offset is only slight. The offset corresponds approximately to one times the web diameter of the front center. This web diameter and, thus, also the offset, varies with the drill diameter and suitably increases with the latter, ascending approximately degressively. For drill diameters of about 3 to 30 mm, the web diameter is preferably about 0.05 to 0.35 mm. The web diameter is preferably determined according to the root of the drill diameter weighted by a constant factor.

The arrangement of the remaining chisel edge in the drill center in combination with the parallel offset of the main cutting edges enables a simple grinding of the two main cutting edges. At the same time, sufficient strength is achieved in the area of the drill center. In addition, due to the very small dimension of the chisel edge and, therefore, of the web diameter, an efficient chip cutting without excessive squeezing is achieved even in the center. In this way, the so-called center chip can efficiently be removed, thus avoiding squeezing in the area of the drill center. In contrast to that, conventional twist drills have a clearly larger web thickness in the area of the drill tip, which also increases with the drill diameter. For example, DIN 1414-1 provides for a drill diameter of 3 mm a minimum web thickness of about 0.5 mm and for a drill diameter of about 30 mm, a minimum web thickness of about 3.5 mm.

To achieve essentially an optimized drilling result and an efficient chip removal, the transition from the main cutting edge over the front center into a flank adjacent to the front center and assigned to the other main cutting edge extends along a front gap radius. The latter preferably increases as the drill diameter increases and lies in the range of 0.5 to 4.2 mm for drill diameters of 3 to 30 mm.

To make grinding substantially easier than it otherwise might possibly be, it is furthermore provided that adjacent to each main cutting edge, there is a first flank with a first flank angle, and adjacent to that, a second flank with a flank angle larger than the first flank angle. The flanks assigned to each of the main cutting edges form approximately roof-shaped faces inclined towards each other at different angles of inclination. Due to the relatively flat first flank, the drill front possesses in the area of the main cutting edges a sufficiently high material strength and is therefore sufficiently stable. Therefore, the cutting wedge which is formed on the main cutting edge and which is defined by the flank and the rake face, which abut to each other on the main cutting edge, is substantially stable. In at least one possible embodiment, the first flank angle is in the range between 10° and 40°, and the second flank angle is in the range between 8° and 20°, the choice of the angle depending on the material. For a drill designed for steel, these two angles may be approximately 6° and 12°, respectively.

In at least one other possible embodiment, it is furthermore provided that the width of the first flank increases from a center width in the area of the drill center towards an outer width on the outer circumference of the drill. In principle, a substantially large width of the first flank is desirable in order to increase the stability of the cutting wedge. At the same time, however, due to the small inclination, the width must not be too large, as otherwise the clearance for the chip to be removed would not be sufficient. The reduction of the width of the first flank towards the drill center takes into account, in at least one possible embodiment, the problematic evacuation of the center chip. In at least one possible embodiment, the width of the first flank increases with increasing drill diameter and amounts for the center width to approximately 0.03 to 0.4 mm and for the outer width, to approximately 0.15 to 0.9 mm, for drill diameters between 3 and 30 mm. The width increases degressively or in a tapered manner, namely continuously with increasing drill diameter and over the entire length of the flank.

In view of the problems of a reliable evacuation of the center chips, suitably a so-called point thinning or web thinning of each chip flute is, furthermore, provided on the drill front. This point thinning is produced by a grinding operation. Through the point thinning, one front gap each is formed in the area of the drill front. For an efficient chip evacuation, this point thinning presents several features, which in at least one embodiment are realized in combination.

On the one hand, it may be provided that the point thinning extends beyond a center line which is perpendicular to the main cutting edges. The point thinning, i.e. the clearance for the chips to be removed, extends over the main cutting edge assigned to the point thinning up to the area of the remaining chisel edge and even up to the area of the second main cutting edge. Furthermore, it is suitably provided that the point thinning includes with the longitudinal axis of the drill an angle of approximately 20° to 40°, or in at least one embodiment approximately 30°. This angle according to at least one embodiment is approximately equal to a helix angle of the chip flute, i.e. the angle at which the marginal line of the respective chip flute extends in relation to the longitudinal axis of the drill. Through this measure, the radial depth of the point thinning inclines in the course of the longitudinal axis of the drill. This directs the chip effectively from the drill center into the helical chip flute.

Preferably, the point thinning possesses in addition a relatively large aperture angle of approximately 70°±15°.

A rake face is adjacent to each main cutting edge, in the direction of each chip flute. This rake face is arranged at a rake angle of preferably approximately −8° to +10°. The rake angle indicates the angle between the rake face and a plane extending parallel to the longitudinal axis of the drill. That means that the rake angle is a measure for a deviation of the rake face from the plane extending parallel to the longitudinal axis of the drill. A positive rake angle indicates an acute cutting wedge, whereas a negative rake angle indicates an obtuse cutting wedge. The rake face is suitably ground together with the point thinning. As the point thinning is ground into the already existing chip flute, the grinding operation changes the existing rake face, i.e., a so-called "rake-angle correction" takes place. The corrected rake face generated by point thinning, adjacent to the main cutting edge, preferably has in the longitudinal direction of the drill a dimension amounting to approximately double the feed value per revolution of the edge, for which the drill is designed according to at least one possible embodiment.

In another possible embodiment, the rake face runs out into a minor cutting edge, for uniform chip evacuation. In the area where the rake face runs out into the minor cutting edge, it has a width in the range of approx. 0.10 to 0.70 mm for drill diameters of approx. 3 to 30 mm.

Due to the essentially completely planar runout of the edge, the drill possesses no front tip fulfilling a centering function. Therefore, according to another possible embodiment, a double chamfer is provided on the circumference of the drill, for an appropriate guidance of the drill. For this purpose, lands are formed on the two marginal sides of the web extending between the chip flutes, the lands determining the outer circumference of the drill.

Also, for the sake of an appropriate guidance of the drill, it is provided that each main cutting edge merges, over a corner cutting edge which is rounded and also possibly chamfered, into a respective minor cutting edge extending along the chip flute. This chamfered or rounded design of the corner cutting edge provides for a self-centering of the drill, such as when spot-drilling. To keep the resulting roundness or chamfer of the bottom of the drilled hole as small as possible, the height of the roundness or of the chamfer, parallel to the longitudinal axis of the drill, is approx. 0.15 to 0.80 mm for a drill diameter of 3 to 30 mm.

Furthermore, in another embodiment it is provided that a corner-edge flank is adjacent to the corner cutting edge, to essentially ensure a reliable chip removal. The flank can comprise two partial flanks or one curved flank.

The above-discussed embodiments of the present application will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in more detail in the following by means of the figures in which:

FIG. 1A is a side view of a drill;

FIG. 1B is a blind hole produced with the drill in a workpiece;

FIG. 2A is a front view of the drill front;

FIG. 2B is an enlarged representation of the area marked with an ellipse in FIG. 2A;

FIG. 3A is a side view of the drill front with front gap;

FIG. 3B is a sectional view of the main cutting edge according to the section III-III in FIG. 3A;

FIG. 4 is a perspective view of the drill front with front gap;

FIG. 5 is another side view of the drill front with corner cutting edge;

FIGS. 6A, 6B are sectional views of different designs in the area of the corner cutting edge according to the sectional view VI-VI in FIG. 5; and FIG. 7 is a top view of the corner cutting edge according to FIG. 5 with a corner radius.

In the figures, features acting in the same way are marked with the same reference numbers.

DESCRIPTION OF EMBODIMENT OR EMBODIMENTS

The drill 2, designed as a twist drill according to FIG. 1A, comprises a shank 4, a body 8 adjacent to it along a longitudinal axis 6 of the drill, the front end of the body 8 being provided with a drill front 10. Helically extending chip spaces or chip flutes 12, with a web 14 each being formed between them, are formed into the body 8. The chip flutes 12 are oriented at a helix angle $\omega$ relative to the longitudinal axis 6. The drill has a drill diameter d which slightly decreases in the direction of the shank 4.

FIG. 1A shows clearly that the drill front 10 is of a virtually completely planar design and lies in a plane which is essentially perpendicular to the longitudinal axis 6. With such a drill 2, a blind hole 18 with a virtually completely planar bottom can be produced in a workpiece 16, as is apparent from FIG. 1B.

The virtually completely planar design of the drill front 10 also enables an easy spot-drilling even on curved surfaces because due to the absence of the conical drill tip usual in a conventional twist drill, the drill will not slip on the curved surface or be minimized.

The virtually completely planar design in the cutting area of the drill front 10 and the absence of the usual conical drill tip entail particular requirements concerning the self-centering and guidance of the drill 2 as well as concerning a reliable chip evacuation, in at least one possible embodiment, of the so-called center chip. To achieve a good guidance of the drill and to essentially guarantee a reliable chip evacuation, the drill 2 possesses a multitude of features which enable, either separately or in their combined effect, a substantially safe and reliable drilling operation with a good drilling result.

As is apparent from FIGS. 2A and 2B, the drill front 10 of the drill 2 includes two main cutting edges 20 merging into each other over a remaining chisel edge 22. The main cutting edges 20 as well as the remaining chisel edge 22 form a common edge extending completely in the plane which is perpendicular to the longitudinal axis 6. The main cutting edges 20 are straight-lined and lie—with the exception of a slight offset caused by the remaining chisel edge 22—substantially in one line. In the transitional area between the two main cutting edges 20 formed by the remaining chisel edge 22, the material thickness is extremely small. In the drill center 24, the drill front 10 has a web diameter k, here shown in the shape of a circle, which is very small as compared with the usual web diameters of twist drills.

A two-piece flank, comprising a first flank 26 and a second flank 28, is adjacent to each of the main cutting edges 20. The first flank 26 is assigned a first flank angle $\alpha 1$ and the second flank 28 is assigned a second flank angle $\alpha 2$, as is apparent from the sectional view according to FIG. 3B in at least one possible embodiment. The first flank 26 has a width increasing from the drill center 24 towards the drill outside, the first flank 26 having in the area of the center a center width b1, and on the outer circumference an outer width b2.

As is apparent from FIG. 2B, in at least one possible embodiment each main cutting edge 20 is situated at a distance from a center line 30 extending through the drill center 24, namely each main cutting edge 20 is arranged behind the center line 30, as viewed relative to the cutting direction 32. The cutting direction 32 indicates the direction of rotation of the drill 2 in accordance with at least one embodiment.

This design with the arrangement of the main cutting edges 20 behind the center as well as the design with the two-piece flank 26, 28 enables a particularly good grinding of the desired edge geometry of the drill 2, as the arrangement of the main cutting edges 20 behind the center minimizes the risk that, when grinding one main cutting edge 20, the other main cutting edge 20 will be touched and will in this way possibly be ground blunt again. The design of the two-piece flank 26, 28 also facilitates the grinding, because due to the larger second flank angle $\alpha 2$, it would hardly be possible to grind up to the drill center 24, as this would weaken the drill center 24 with the small web diameter k in at least one possible embodiment. Due to the relatively shallow first flank angle $\alpha 1$, the drill 2 is designed sufficiently thick and, therefore, stable, in the area of the main cutting edge 20. In this way, a sufficiently stable cutting wedge is achieved. Such a cutting wedge is shown in FIG. 3B. The cutting wedge is formed by the flanks 26, 28 and a rake face 34 extending in the chip flute 12 up to the main cutting edge 20.

At least one problem of drills in general is a reliable chip evacuation of the center chip as here no relative movement, or only a slight relative movement, takes place between the drill 2 and the workpiece 16. The drill 2 with the planar edge geometry described herein imposes particular requirements on chip evacuation.

In order to enable a substantially reliable chip evacuation, a point thinning or web thinning 36 (cf. FIGS. 2A, 3A), in at least one possible embodiment, in connection with the very small web diameter k in the area of the remaining chisel edge 22, is provided. To achieve the point thinning 36, usually a suitably shaped grinding wheel is introduced into the chip flute 12 in the area of the drill front 10. In this way, the existing chip flute 12 and the rake angle $\epsilon 1$, respectively, are "corrected" (cf. FIG. 3B). As a result, the point thinning 36 is formed, which is understood herein as a certain course of a surface in the area of the chip flute 12 which is adjacent to the respective main cutting edge 20. The course of the point thinning is apparent from FIGS. 2A, 3A, 4, and 5.

The entire point thinning 36, also called "front gap", possesses an aperture angle $\gamma$, shown in FIG. 4. This angle is very large, in the range of approximately 70°.

The point thinning 36 extends beyond the center, as shown in FIG. 2A. This means that the point thinning 36 extends beyond a further center line 38, oriented perpendicular to the first center line 30 and, therefore, perpendicular to the course of the main cutting edges 20. As is apparent from FIG. 2A, in at least one possible embodiment, the point thinning 36 assigned to one of the main cutting edges 20 extends almost up to a level corresponding to the web diameter k, at which the other main cutting edge 20 begins. Thanks to this measure, a very large clearance is available for a chip removed in the center, through which it can be evacuated. The course of the point thinning 36 in the area of the front center is formed by a front gap radius r (FIG. 4) which increases with increasing drill diameter d and lies in the range of 0.5 to 4.2 mm for drill diameters d between 3 and 30 mm.

Related to the longitudinal axis 6 of the drill, the point thinning 36 extends at a point-thinning angle $\delta$ of approximately 30° (FIG. 3A). This point-thinning angle $\delta$ extends almost parallel to the helix angle $\omega$, at which the chip flute 12 is oriented towards the longitudinal axis 6. The point-thinning angle $\delta$ is, therefore, almost as large as the helix angle $\omega$. Therefore, the point thinning 36 runs out in the direction of the longitudinal axis 6, i.e. the radial depth of the point thinning 36 decreases in longitudinal direction of the drill 2. Through this measure, the chip is evacuated into the two chip flutes 12.

Immediately adjacent to the main cutting edge 20, the point thinning 36 includes and defines in addition the rake face 34, as is apparent, in at least one possible embodiment, from FIG. 3A and FIG. 5. This rake face 34 extends up to a corner cutting edge 42 forming a transition between the main cutting edge 20 and a minor cutting edge 44 (FIG. 3A, FIG. 4, FIG. 5). The rake face 34 has a width b3 running out towards the minor cutting edge 44 and in a central area, it has a minimum width b4. The rake face width b4 is determined, in at least one possible embodiment, by the feed for which the drill 2 is designed. Namely, the rake face width b4 is preferably double or possibly more than double the feed per revolution of the drill 2. The rake face width b3 lies, in at least one embodiment, in the range of 0.1 to 0.7 mm for drill diameters d of approximately 3 to 30 mm and the minimum rake face width b4 should not be less than 0.05 to 0.25 mm for the entire range of the drill diameter d. For light-metal workpiece materials, e.g. aluminum, the rake face width b3 may also be 0.

As is apparent from FIG. 5, the point thinning 36 is designed in the area of the rake face 34, in at least one possible embodiment, in such a way that the end of the rake face 34, running out in the direction of the longitudinal axis 6, meets the transitional point where the corner cutting edge 42 merges into the minor cutting edge 44. In this way, a harmonious and uniform transition is achieved.

The rake face 34 is arranged at a rake angle $\epsilon 1$ to a plane extending parallel to the longitudinal axis 6, as is apparent in at least one possible embodiment, from FIG. 3B. The rake angle $\epsilon 1$ is fixed, depending on the material to be drilled, at a value between −8° and +10°. In FIG. 3B, a positive rake angle $\epsilon 1$ is shown, so that altogether an acute cutting wedge is formed, i.e. the angle between the plane which is perpendicular to the longitudinal axis 6 of the drill and the rake face 34 is smaller than 90°. A negative rake angle means an obtuse cutting wedge with an angle larger than 90°. In case of a negative orientation, the rake face width b3 is even slightly smaller than the above-mentioned values.

Furthermore, for the drill 2 with the plane cutting geometry, some measures are provided through which, either separately or through their combination, a substantially optimized guidance of the drill 2 is achieved. First, it is provided that the drill 2 is formed with a double land. That means that on each of the two lateral margins of the webs 14, a land 46 is provided, as is apparent, in at least one possible embodiment, from FIG. 2A. Through the lands 46, the drill 2 is centrally guided in the drill-hole, the lands 46 forming on the circumference of the drill a web-shaped elevation over the remaining outer surface of the webs 14. Thus, the lands 46 define the outer circumference of the drill.

As can also be seen in FIG. 2A, the point thinning 36 ends at a distance before the land 46 which is at the rear of the respective web 14, i.e. facing away from the main cutting edge 20. This essentially guarantees that this land 46 will not be damaged through the grinding of the point thinning 36, or at least not damaged in any noticeable or substantial manner.

Furthermore, for a good guidance, a suitable geometry of the corner cutting edges 42 is provided, such as the latter being chamfered, as is apparent from FIG. 5, or rounded, as is apparent from the enlarged view according to FIG. 7. The chamfer or roundness causes a certain self-centering of the drill. At the same time, it fixes the edge geometry of the blind hole 18 in the area of the drill-hole bottom. Depending on the desired edge geometry, different shapes can be provided.

In view of the target to make the drill-hole bottom as plane or flat as possible, the height h of this roundness or chamfer is, however, only approximately 0.15 to 0.80 mm for drill diameters d of 3 to 30 mm (cf. FIG. 5).

To promote an adequate chip evacuation in the area of the corner cutting edge 42, corner-edge flanks 48 are provided on the corner cutting edges 42, as is apparent from FIGS. 6A and 6B. According to FIG. 6A, the corner-edge flank 48 is formed by two partial flanks 47, 49, comparable with the first and second flanks 26, 28 adjacent to each main cutting edge 20. According to FIG. 6B, the flank 48 is rounded and formed as a clearance produced by grinding.

The first partial flank 47 adjacent to the corner cutting edge 42 is arranged at a first partial-flank angle α3 and the second partial flank 49 adjacent to this flank 47 is arranged at a second, larger partial-flank angle α4, the first partial-flank angle α3 preferably lying in the range between 4° and 12°, depending on the material to be cut.

In the second embodiment according to FIG. 6B, the flank 48 is oriented at a flank angle α5, which is chosen, depending on the material to be cut and also depending on the drill diameter d, in the range of 30 to 100.

As is apparent, in at least one possible embodiment, from FIG. 6B, the rake face 34 extends in the direction of the respective chip flutes 12. The width of the rake face lies, depending on the material to be cut, in the range of 0.05 to 0.30 mm. The rake face 34 is arranged in the area of the corner cutting edge 42 at a corner-edge rake angle ε2 (cf. FIG. 6A), which is chosen, depending on the material to be cut, in the range of −8° to +8°.

To cool the drill 2, the latter includes coolant channels 50 formed into the body 8, as is apparent from FIG. 2A. To promote a smooth chip evacuation, it is furthermore provided that the chip space formed by the chip flutes 12 has a chip-evacuation cross-section increasing towards the shank 4, i.e the cross-section of each chip flute 12 formed perpendicular to the longitudinal axis 6 increases in the direction of the shank. This is achieved either through a so-called core taper and/or through a so-called chip-space opening.

The plane-bottom drill described herein is characterized by very good drilling properties and, therefore, offers a particularly efficient cutting tool for different requirements. One must emphasize, in at least one possible embodiment, its suitability for producing blind holes with plane bottoms and for producing through holes with little burr, the possibility to apply the drill even on curved surfaces, as well as its good centering ability. These properties are achieved through the special geometrical design of the plane-bottom drills. In addition to the design and the arrangement of the main cutting edges 20, the special geometry of the point thinning 36, of the double lands 46, of the corner cutting edges 42, and of the rake face 34 are of particular importance.

A drill, in at least one possible embodiment a twist drill, has a body provided with chip flutes as well as a drill front comprising two main cutting edges merging into each other. In order to enable the drilling of a blind hole with a bottom as plane as possible, it is provided that the main cutting edge forms a continuous symmetrical edge extending in a plane which is perpendicular to the longitudinal axis of the drill. Therefore, the main cutting edges are oriented to each other at an angle of 180°.

In at least one possible embodiment, a drill, such as a twist drill, may have a single cutting edge. In at least one possible embodiment, a drill may have a straight edge flute, or possibly multiple flutes that are straight.

One feature or aspect of an embodiment is believed at the time of the filing of this patent application to possibly reside broadly in a twist drill for drilling blind holes with planar bottom surfaces, said twist drill comprising: a shank portion and a fluted portion comprising two chip flutes; a planar end face being disposed at an end of said fluted portion opposite said shank portion; said planar end face comprising two main cutting edges and a chisel edge disposed there between; said two main cutting edges being substantially aligned with one another and joined by said chisel edge to form a continuous cutting edge; each of said main cutting edges and said chisel edge being disposed to lie in a plane perpendicular to the central longitudinal axis of the drill; and each of said main cutting edges being disposed to trail, in a direction of rotation of said drill, a distance behind a center line disposed coplanar to said main cutting edges which said center line extends through the center longitudinal axis of said drill and substantially parallel to each of said main cutting edges, the distance between said center line and said main cutting edges being substantially less than the length of either of said main cutting edges.

Another feature or aspect of an embodiment is believed at the time of the filing of this patent application to possibly reside broadly in a drill for drilling holes, said drill comprising: a shank portion and a fluted portion comprising at least one chip flute; a planar end face comprising at least one main cutting edge; said at least one main cutting edge comprising a first main cutting edge being disposed to lie in a plane perpendicular to the central longitudinal axis of the drill; and said first main cutting edge being disposed to trail, in a direction of rotation of said drill, a distance behind a radius disposed coplanar to said first main cutting edge which said radius extends from the center longitudinal axis of said drill and substantially parallel to said first main cutting edge, the distance between said radius and said first main cutting edge being substantially less than the length of said first main cutting edge.

Yet another feature or aspect of an embodiment is believed at the time of the filing of this patent application to possibly reside broadly in a drill 2, in at least one possible embodiment a twist drill, having a body 8 provided with chip flutes 12, as well as a drill front 10 provided with two main cutting edges 20 merging into each other, forming a continuous edge extending in a plane which is perpendicular to the longitudinal axis 6 of the drill, wherein the main cutting edges 20 related to a cutting direction 32, are arranged behind a center line 30, lying in the plane which is perpendicular to the longitudinal axis 6 of the drill and extending through the center 24 of the drill as well as in the direction of the main cutting edges 20.

Still another feature or aspect of an embodiment is believed at the time of the filing of this patent application to possibly reside broadly in the drill 2, wherein the main cutting edges 20 are straight-lined.

Another feature or aspect of an embodiment is believed at the time of the filing of this patent application to possibly reside broadly in the drill 2, wherein the main cutting edges 20 are connected with each other in a front center of the drill front 10 through a remaining chisel edge 22, so that the main cutting edges 20 are offset against each other in the plane which is perpendicular to the longitudinal axis 6 of the drill.

Yet another feature or aspect of an embodiment is believed at the time of the filing of this patent application to possibly reside broadly in the drill 2, wherein the front center has a web diameter k increasing approximately linearly with the drill diameter d and lying in the range of 0.05 to 0.35 mm for drill diameters d of approximately 3 to 30 mm.

Still another feature or aspect of an embodiment is believed at the time of the filing of this patent application to possibly reside broadly in the drill 2, wherein the main cutting edge 20 is connected through the front center with a flank 28, along a circular curve having a front gap radius r, the front gap radius r increasing, in at least one possible embodiment, approximately from 0.5 to 4.2 mm for drill diameters d from 3 to 30 mm.

A further feature or aspect of an embodiment is believed at the time of the filing of this patent application to possibly reside broadly in the drill 2, wherein adjacent to the respective main cutting edge 20, there is a first flank 26 with a first flank angle α1, and adjacent to that, a second flank 28 with a second flank angle α2 which is larger than the first flank angle.

Another feature or aspect of an embodiment is believed at the time of the filing of this patent application to possibly reside broadly in the drill 2, wherein the first flank angle α1 lies in the range between 4° and 10°, and the second flank angle α2 lies in the range between 8° and 20°.

Yet another feature or aspect of an embodiment is believed at the time of the filing of this patent application to possibly reside broadly in the drill 2, wherein the first flank angle α1 lies at approximately 6°, and the second flank angle α2 lies at approximately 12°.

Still another feature or aspect of an embodiment is believed at the time of the filing of this patent application to possibly reside broadly in the drill 2, wherein the width of the first flank 26 increases from a center width b1 in the area of the drill center 24 up to an outer width b2 on the outer circumference of the drill.

A further feature or aspect of an embodiment is believed at the time of the filing of this patent application to possibly reside broadly in the drill 2, wherein the width of the first flank 26 increases altogether with increasing drill diameter d and that for drill diameters d of approximately 3 to 30 mm, the center width b1 lies approximately between 0.03 and 0.4 mm and the outer width b2, approximately between 0.15 and 0.9 mm.

Another feature or aspect of an embodiment is believed at the time of the filing of this patent application to possibly reside broadly in the drill 2, wherein each chip flute 12 is provided on the drill front 10 with a point thinning 36 extending beyond a further center line 38 which is perpendicular to the main cutting edges 20.

Yet another feature or aspect of an embodiment is believed at the time of the filing of this patent application to possibly reside broadly in the drill 2, wherein the point thinning 36 includes with the longitudinal axis of the drill 6 a point-thinning angle δ between approximately 20° and 40°.

Still another feature or aspect of an embodiment is believed at the time of the filing of this patent application to possibly reside broadly in the drill 2, wherein each chip flute 12 forms on the drill front 10 a point thinning 36 which possesses an aperture angle γ—viewed in a plane perpendicular to the longitudinal axis of the drill—of approximately 70°.

A further feature or aspect of an embodiment is believed at the time of the filing of this patent application to possibly reside broadly in the drill 2, wherein adjacent to each main cutting edge 20, towards each chip flute 12, there is a rake face 34 forming a rake angle ε of −8° to +10° with the main cutting edge 20.

Another feature or aspect of an embodiment is believed at the time of the filing of this patent application to possibly reside broadly in the drill 2, wherein the rake face 34 runs out into a minor cutting edge 44 and has a rake-face width b3 in the range of approximately 0.10 to 0.70 mm for drill diameters d of approximately 3 to 30 mm.

Yet another feature or aspect of an embodiment is believed at the time of the filing of this patent application to possibly reside broadly in the drill 2, wherein the body 8 forms a web 14 each between the chip flutes 12, whose two marginal sides are provided with one land 46 each towards the chip flutes 12.

Still another feature or aspect of an embodiment is believed at the time of the filing of this patent application to possibly reside broadly in the drill 2, wherein each main cutting edge 20 merges into a respective minor cutting edge 44 extending along the chip flute 12, through a rounded or chamfered corner cutting edge 42.

A further feature or aspect of an embodiment is believed at the time of the filing of this patent application to possibly reside broadly in the drill 2, wherein the height h of the roundness or chamfer—viewed in the direction of the longitudinal axis 6 of the drill—amounts to approximately 0.15 to 0.80 mm for drill diameters d of approximately 3 to 30 mm and a corner-edge flank 48 is adjacent to the corner cutting edge 42.

The components disclosed in the various publications, disclosed or incorporated by reference herein, may possibly be used in possible embodiments of the present application, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the application, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Nov. 3, 2005 and/or cited elsewhere are hereby incorporated by reference as if set forth in their entirety herein as follows: U.S. Pat. No. 6,135,681; U.S. Pat. No. 5,700,113; European Patent No. 0089123; German Patent No. 1177904; U.S. Pat. No. 6,315,505; and U.S. Pat. No. 5,626,446.

All of the patents, patent applications or patent publications, which were cited in the German Search Report dated Sep. 3, 2004 and/or cited elsewhere are hereby incorporated by reference as if set forth in their entirety herein as follows: German Patent No. 4417166 A1; German Patent No. 1177904 A; German Patent No. 29609017 U1; German Patent No. 20209767 U1; German Patent No. 8901319 U1; and European Patent No. 089123 A1.

The corresponding foreign and international patent publication applications, namely, Federal Republic of Germany Patent Application No. 20 2004 008 700.6, filed on May 28, 2004, and DE-OS 20 2004 008 700.6 and DE-PS 20 2004 008 700.6, and Federal Republic of Germany Patent Application No. 20 2004 010 977.8, filed on Jul. 14, 2004, and DE-OS 20 2004 010 977.8 and DE-PS 20 2004 010 977.8, and International Application No. PCT/EP2005/005234, filed on May 13, 2005, having WIPO Publication No. WO2005/118191 A1 and inventors Werner Reinhardt and Tilo Krieg, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the present application described herein above in the context of the preferred embodiments are not to be taken as limiting the embodiments of the application to all of the provided details thereof, since modifications and variations thereof may be made without departing from the spirit and scope of the embodiments of the present application.

What is claimed is:

1. A twist drill for drilling blind holes with planar bottom surfaces, said twist drill comprising:

a shank portion and a fluted portion comprising two chip flutes;

a planar end face being disposed at an end of said fluted portion opposite said shank portion;

said planar end face comprising two main cutting edges and a chisel edge disposed there between;

said two main cutting edges being substantially aligned with one another and joined by said chisel edge to form a continuous cutting edge;

each of said main cutting edges and said chisel edge being disposed to lie in a plane perpendicular to the central longitudinal axis of the drill; and each of said main cutting edges being disposed to trail, in a direction of rotation of said drill, a distance behind a center line disposed coplanar to said main cutting edges which said center line extends through the center longitudinal axis of said drill and substantially parallel to each of said main cutting edges, the distance between said center line and said main cutting edges being substantially less than the length of either of said main cutting edges.

2. A drill for drilling holes, said drill comprising:
a shank portion and a fluted portion comprising at least one chip flute;
a planar end face comprising at least one main cutting edge;
said at least one main cutting edge comprising a first main cutting edge being disposed to lie in a plane perpendicular to the central longitudinal axis of the drill; and
said first main cutting edge being disposed to trail, in a direction of rotation of said drill, a distance behind a radius disposed coplanar to said first main cutting edge which said radius extends from the center longitudinal axis of said drill and substantially parallel to said first main cutting edge, the distance between said radius and said first main cutting edge being substantially less than the length of said first main cutting edge.

3. A drill (2), having a body (8) provided with chip flutes (12), as well as a drill front (10) provided with two main cutting edges (20) merging into each other, forming a continuous edge extending in a plane which is perpendicular to the longitudinal axis (6) of the drill, wherein the main cutting edges (20), with respect to a cutting direction (32), are arranged behind a center line (30) lying in the plane which is perpendicular to the longitudinal axis (6) of the drill and extending through the center (24) of the drill as well as in the direction of the main cutting edges 20.

4. The drill (2) according to claim 3, wherein the main cutting edges (20) are straight-lined.

5. The drill (2) according to claim 4, wherein the main cutting edges (20) are connected with each other in a front center of the drill front (10) through a remaining chisel edge (22), so that the main cutting edges (20) are offset against each other in the plane which is perpendicular to the longitudinal axis (6) of the drill.

6. The drill (2) according to claim 5, wherein the front center has a web diameter (k) being approximately directly proportional to the drill diameter (d), and the web diameter (k) lies in the range of approximately 0.05 to 0.35 mm for drill diameters (d) of approximately 3 to 30 mm.

7. The drill (2) according to claim 6, wherein the main cutting edge (20) is connected through the front center with a flank (28), along a circular curve having a front gap radius (r), the front gap radius (r) being approximately directly proportional to the drill diameter (d), and the gap radius (r) lies in the range of approximately 0.5 to 4.2 mm for drill diameters (d) of approximately 3 to 30 mm.

8. The drill (2) according to claim 7, wherein adjacent to the respective main cutting edge (20), there is a first flank (26) with a first flank angle ($\alpha1$), and adjacent to that, a second flank (28) with a second flank angle ($\alpha2$) which is larger than the first flank angle.

9. The drill (2) according to claim 8, wherein the first flank angle ($\alpha1$) lies in the range between 4° and 10°, and the second flank angle ($\alpha2$), in the range between 8° and 20°.

10. The drill (2) according to claim 9, wherein the first flank angle ($\alpha1$) lies at approximately 6°, and the second flank angle ($\alpha2$), lies at approximately 12°.

11. The drill (2) according to claim 10, wherein the width of the first flank (26) increases from a center width (b1) in the area of the drill center (24) up to an outer width (b2) on the outer circumference of the drill.

12. The drill (2) according to claim 11, wherein the width of the first flank (26) being approximately directly proportional to the drill diameter (d), and that for drill diameters (d) of approximately 3 to 30 mm, the center width (b1) lies approximately between 0.03 and 0.4 mm, and the outer width (b2) lies approximately between 0.15 and 0.9 mm.

13. The drill (2) according to claim 12, wherein each chip flute (12) is provided on the drill front (10) with a point thinning (36) extending beyond a further center line (38) which is perpendicular to the main cutting edges (20).

14. The drill (2) according to claim 13, wherein the point thinning (36) includes with the longitudinal axis of the drill (6) a point-thinning angle ($\delta$) between approximately 20° and 40°.

15. The drill (2) according to claim 14, wherein each chip flute (12) forms on the drill front (10) a point thinning (36) which possesses an aperture angle (Y) —viewed in a plane perpendicular to the longitudinal axis of the drill —of approximately 70°.

16. The drill (2) according to claim 15, wherein adjacent to each main cutting edge (20), towards each chip flute (12), there is a rake face (34) forming a rake angle ($\epsilon$) of −8° to +10° with the main cutting edge (20).

17. The drill (2) according to claim 16, wherein the rake face (34) runs out into a minor cutting edge (44) and has a rake-face width (b3) in the range of approximately 0.10 to 0.70 mm for drill diameters (d) of approximately 3 to 30 mm.

18. The drill (2) according to claim 17, wherein the body (8) forms a web (14) each between the chip flutes (12), whose two marginal sides are provided with one land (46) each towards the chip flutes (12).

19. The drill (2) according to claim 18, wherein each main cutting edge (20) merges into a respective minor cutting edge (44) extending along the chip flute (12), through a rounded or chamfered corner cutting edge (42).

20. The drill (2) according to claim 19, wherein the height (h) of the roundness or chamfer—viewed in the direction of the longitudinal axis (6) of the drill—amounts to approximately 0.15 to 0.80 mm for drill diameters (d) of approximately 3 to 30 mm; and
a corner-edge flank (48) is adjacent to the corner cutting edge (42).

* * * * *